(12) United States Patent   (10) Patent No.: US 6,176,197 B1
Thompson                    (45) Date of Patent:     Jan. 23, 2001

(54) TEMPERATURE INDICATOR EMPLOYING COLOR CHANGE

(75) Inventor: Gary M. Thompson, Turlock, CA (US)

(73) Assignee: Volk Enterprises Inc., Turlock, CA (US)

( * ) Notice: Under 35 U.S.C. 154(b), the term of this patent shall be extended for 0 days.

(21) Appl. No.: 09/184,161

(22) Filed: Nov. 2, 1998

(51) Int. Cl.$^7$ .............................. G01K 11/12; G01K 11/16
(52) U.S. Cl. ........................... 116/217; 116/219; 99/342; 374/162; 374/155
(58) Field of Search .................................. 116/217, 218, 116/216, 207, 219, 206; 374/160, 162, 155; 99/342

(56) References Cited

U.S. PATENT DOCUMENTS

| 1,000,673 | 8/1911 | Diack ................................. 116/217 |
| 1,191,572 | 7/1916 | Davis ................................. 206/63.3 |
| 2,788,282 | 4/1957 | Hammond, Jr. ...................... 116/218 |
| 2,856,930 | 10/1958 | Huyck et al. ...................... 604/404 |
| 2,915,405 | 12/1959 | Hammond, Jr. et al. ............ 116/218 |
| 3,090,236 | 5/1963 | Nicol ................................. 116/207 |
| 3,518,961 | 7/1970 | Kovac ................................. 116/217 |
| 3,713,416 | 1/1973 | Volk ................................. 374/160 |
| 3,759,103 | 9/1973 | Volk ................................. 374/160 |
| 3,820,499 | * 6/1974 | Kliewer et al. ...................... 116/217 |
| 3,965,741 | 6/1976 | Wachtell et al. ...................... 374/102 |
| 3,965,848 | 6/1976 | Shotkin ................................. 116/218 |
| 4,082,000 | 4/1978 | Volk ................................. 374/106 |
| 4,083,364 | * 4/1978 | Kelly et al. .......................... 116/217 |
| 4,187,799 | 2/1980 | Zwarun ................................. 116/217 |
| 4,421,053 | 12/1983 | Volk ................................. 116/218 |
| 4,748,931 | 6/1988 | Volk ................................. 116/218 |
| 4,753,188 | * 6/1988 | Schmoegner ........................ 116/207 |
| 5,215,378 | * 6/1993 | Manske ................................. 116/216 |
| 5,323,730 | * 6/1994 | Ou-Yang ............................... 116/218 |
| 5,460,117 | 10/1995 | Loustaunau .......................... 116/218 |
| 5,537,950 | * 7/1996 | Ou-Yang ............................... 116/217 |
| 5,622,137 | * 4/1997 | Lupton, Jr. et al. .................. 374/155 |
| 5,695,284 | * 12/1997 | Waters ................................. 116/217 |
| 5,799,606 | * 9/1998 | Volk et al. ............................ 116/217 |

FOREIGN PATENT DOCUMENTS

| 2250431 | * 7/1975 | (FR) | ................................. 116/219 |
| 2621688 | * 4/1989 | (FR) | ................................. 116/207 |
| 1450381 | * 9/1976 | (GB) | ................................. 116/217 |
| 1604648 | * 12/1981 | (GB) | ................................. 116/216 |
| 1604649 | * 12/1981 | (GB) | ................................. 116/216 |

* cited by examiner

*Primary Examiner*—Diego Gutierrez
*Assistant Examiner*—Stanley J. Pruchnic, Jr.
(74) *Attorney, Agent, or Firm*—Flehr Hohbach Test Albritton & Herbert LLP

(57) ABSTRACT

A temperature indicator (10) including an elongated piece of tubing (12), a top cap (14), a bottom tip (16), a first media (22) with a first melting point, and a second solid media (24) with a second melting point. Mixing of the first and second media (22, 24) produces a color change within the tubing, which is noticeable at the top end of the indicator, which in use is sticking out of the food product.

20 Claims, 3 Drawing Sheets

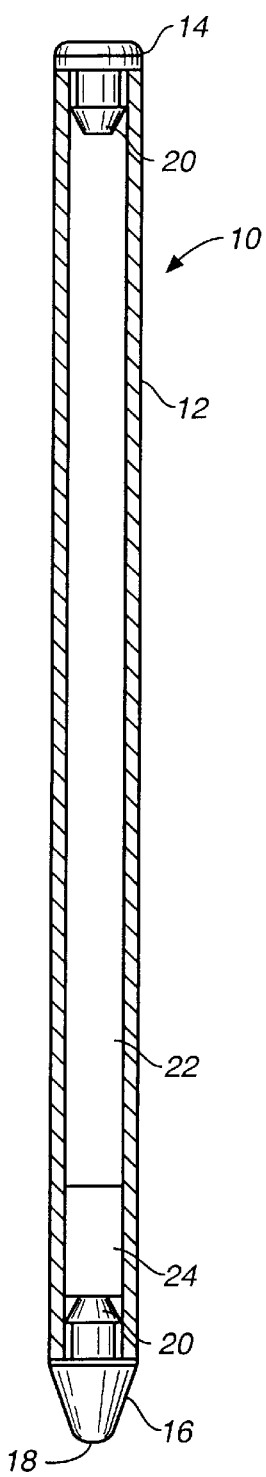
FIG._1
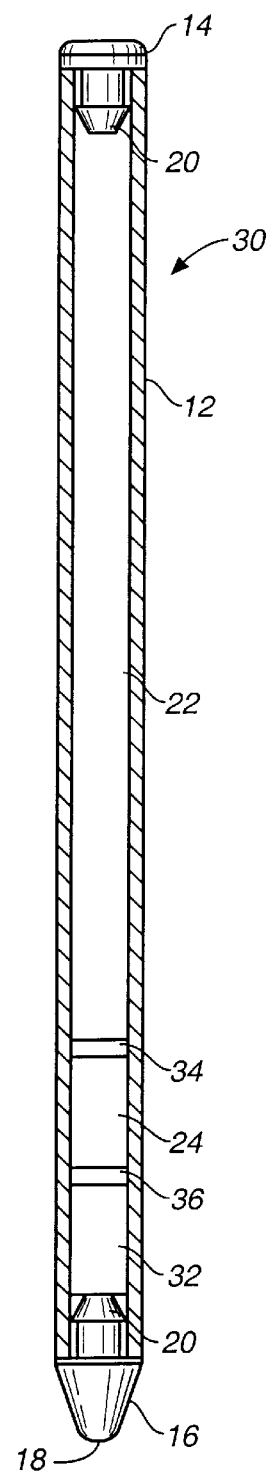
FIG._2
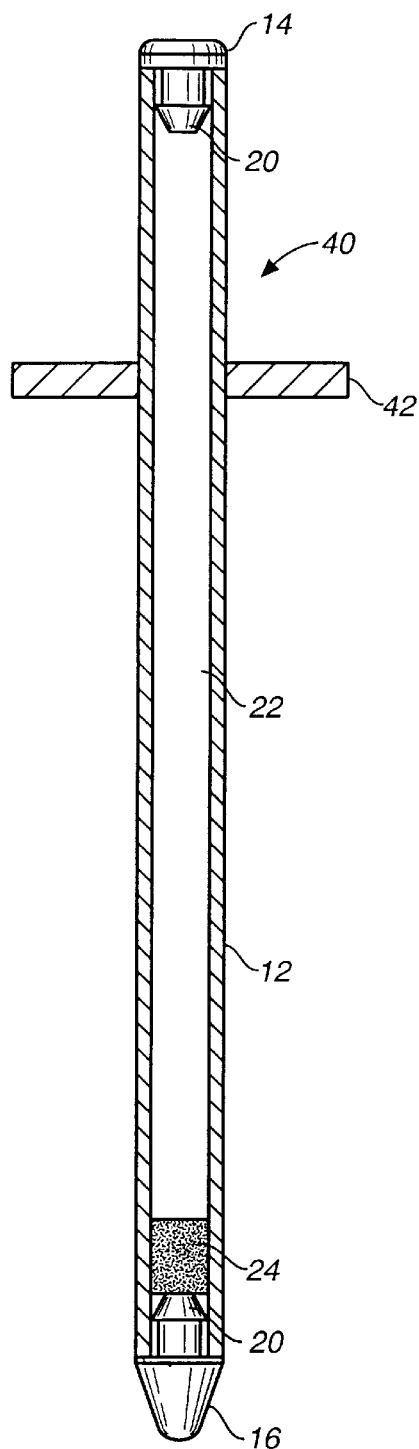
FIG._3

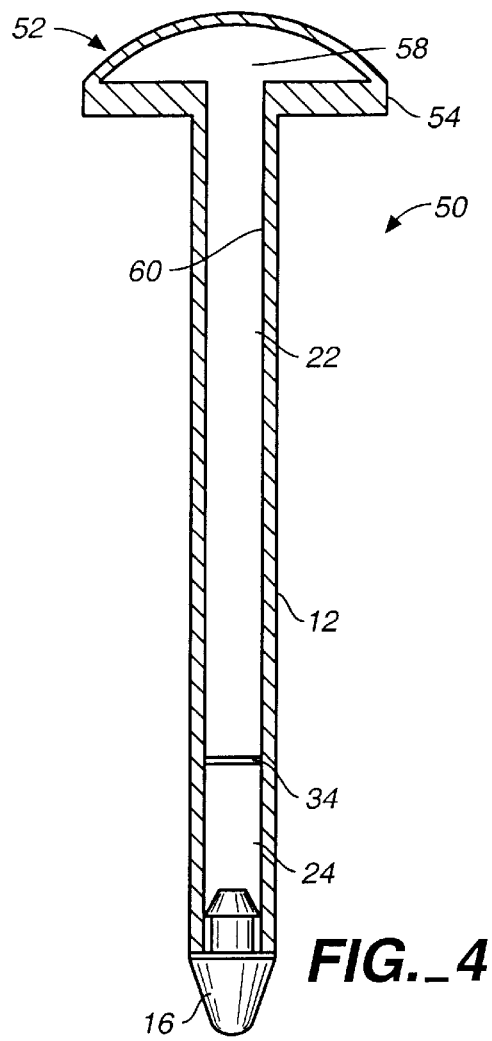
FIG._4
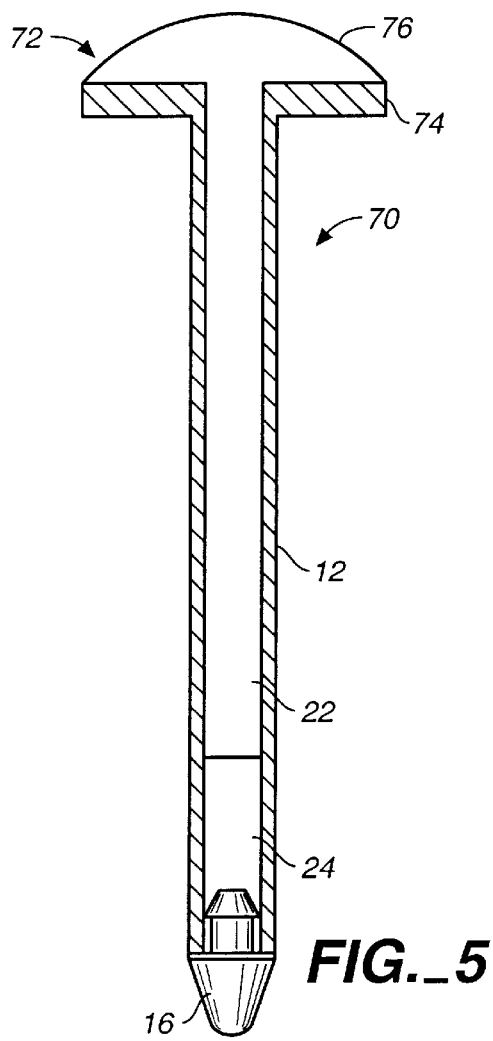
FIG._5
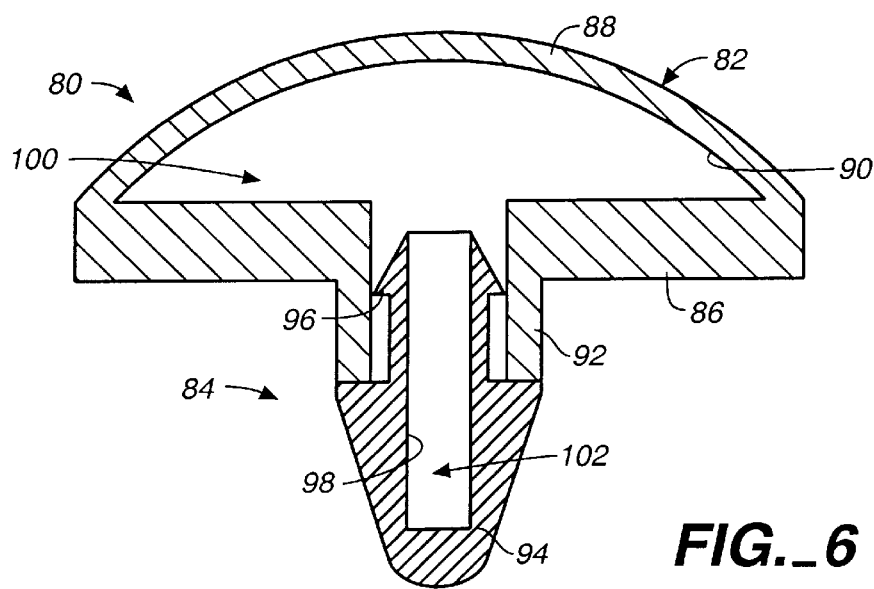
FIG._6

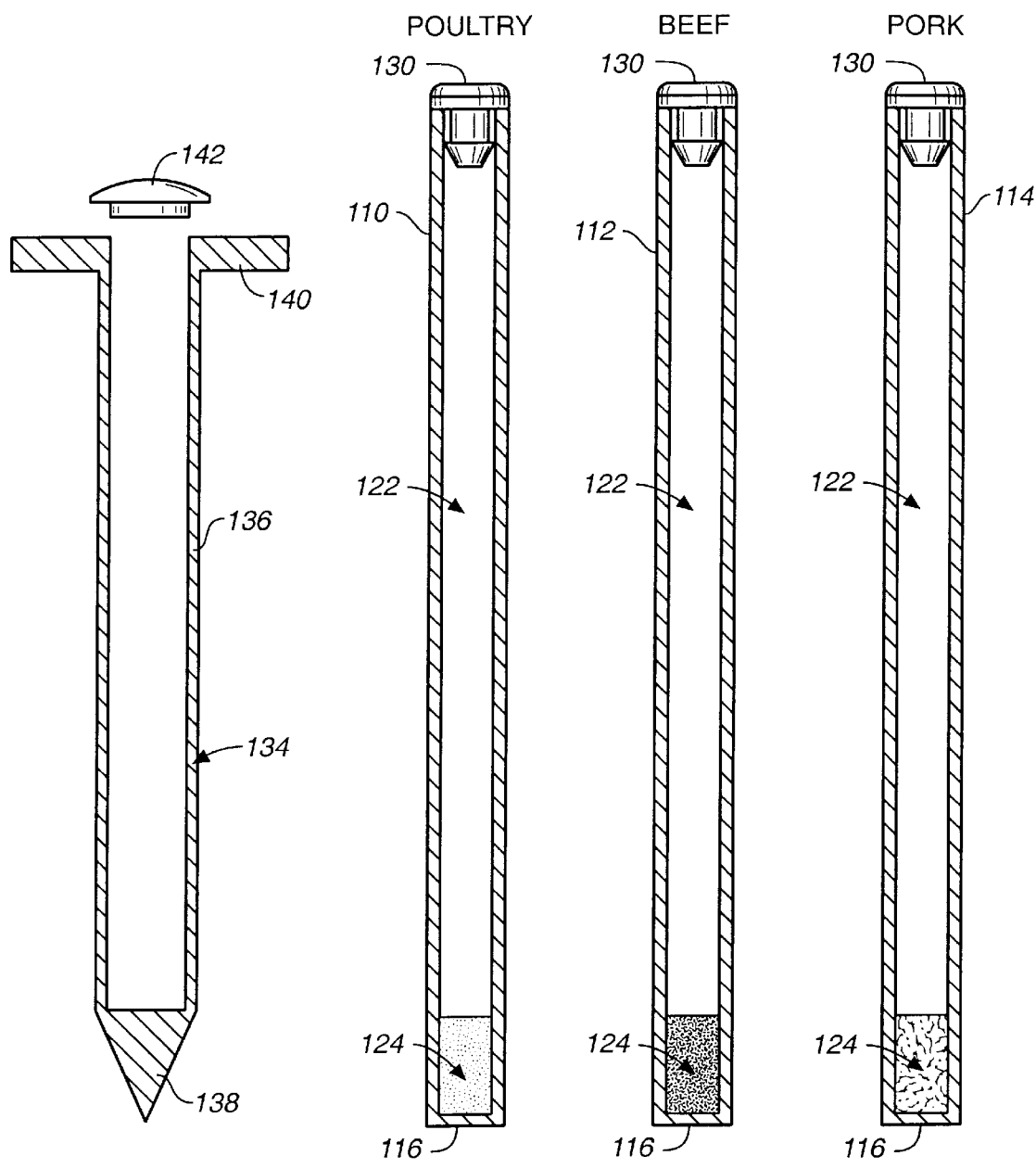
FIG._7

TEMPERATURE INDICATOR EMPLOYING COLOR CHANGE

TECHNICAL FIELD

The present invention relates to temperature indicators for use in cooking various food products such as, for example, meat, fish and poultry products, and are inserted into and cooked with the food product, and upon reaching a certain temperature provide an indication that the inside of the food product has reached a desired temperature.

BACKGROUND ART

The assignee of the present invention, Volk Enterprises Inc., manufactures and sells a variety of pop-up food grade temperature indicators that typically are pre-inserted into a food product, such as whole chickens or turkeys, and sold to consumers with the poultry or meat product and are designed to be cooked with the product. During cooking, when the inner tip of the temperature indicator reaches a specified temperature particular to a metal alloy within the temperature indicator, the alloy melts, allowing an interior spring to force a stem to "pop up," indicating that the food product has reached the desired temperature. While these pop-up temperature indicators are widely used, there is a need to provide an improved temperature indicator design that achieves a total seal for the components of the temperature indicator.

U.S. Pat. No. 3,090,236 of Nicol, entitled "Temperature Indicating Devices," discloses a temperature indicator with a totally sealed temperature indicator enclosure in which are held two different aqueous solutions separated by a non-aqueous solid layer and a ball bearing. When inserted into, for example, a frozen food product, the solid, non-aqueous layer melts when the food product has thawed, and the two aqueous solutions mix and produce a substantially permanent coloration dissimilar from the color of the liquids prior to mixing. The solid, non-aqueous layer is designed to melt at temperatures in the range of thawing temperatures for common food items, with the patent giving specific examples for temperatures ranging from –20° F. to 79° F. While the temperature indicator of Nicol appears to provide a suitable indication for determining when food products have thawed, its design and application are limited to a narrow range of relatively low temperatures, due to the nature of the aqueous solutions and the plasticised PVC or polyethylene tubing used for the indicator device.

DISCLOSURE OF INVENTION

Briefly described, the temperature indicator of the present invention comprises an enclosed tubular translucent structure, a first media within the enclosed tubular structure occupying a substantial portion of a first half of the enclosed tubular structure, and a second media within the enclosed tubular structure away from said first half of the enclosed tubular structure. The first media has a first color and a melting point at or below the desired temperature and the second media has a second color and a melting point at or below the desired temperature. The first and second media are a homogenous solution upon melting and mixing with one another, whereupon the first and second solid media melt at the desired temperature and subsequently mix to form a homogenous solution having a color that is different from the first color.

According to an aspect of the invention, the first media is a solid media and the second media has a specific gravity that is less than the specific gravity of the first solid media, so that with the enclosed tubular structure oriented with the first end up, the second media rises up into the first solid media when the two are in a liquid state, enhancing mixing of the two media. Preferably, the first and second media are made of one of an organic material and food grade wax media.

According to another aspect of the invention, the enclosed tubular structure is comprised of a length of tubing and top and bottom caps that seal off the open ends of the tubing. The tubing and top and bottom caps are made of a material suitable for cooking temperatures required to properly cook common food items.

According to another aspect of the invention, the enclosed tubular structure includes a device that ensures proper seating of the temperature indicator into a food product. Preferably, the proper seating device comprises a depth flange.

According to another aspect of the invention, the enclosed tubular structure includes a wide top end with a large space filled with the first solid media, which when melted and mixed with the second media, creates a large, easily noticeable color indication. The wide top end creates a flange for properly seating the temperature indicator into a food product.

According to another embodiment of the invention, the temperature indicator includes an enclosed tubular translucent structure and a temperature indicating media within the tubular translucent structure. The temperature indicating media has a first color at room temperature and a second color at a desired temperature to be indicated. The indicator also includes a holder for inserting into a food product and for receiving the enclosed tubular translucent structure in order to position one end of the tubular translucent structure within the interior of the food product. The holder has a length that is shorter than the length of the tubular translucent structure, so that a second, opposite end of the tubular translucent structure sticks out of the holder when inserted therein and is visible in a manner that the second color of the tubular translucent structure can be seen at the exterior of the food product.

According to an aspect of this embodiment of the invention, the holder has a closed, bottom end and an open top end for receiving the tubular translucent structure. Preferably, the holder has a flange at its open end for seating the holder into the food product, and the open end includes a removable cap for closing the open end.

According to another aspect of the invention, either the first or second media may be solid at room temperature, so that mixing does not occur until the solid media melts and thereafter mixes with the other liquid media to form a homogenous solution of uniform color.

These and other features, objects, and advantages of the present invention will become apparent from the following description of the best mode for carrying out the invention, when read in conjunction with the accompanying drawings, and the claims, which are all incorporated herein as part of the disclosure of the invention.

BRIEF DESCRIPTION OF THE DRAWINGS

Throughout the several views, like reference numerals refer to like parts, wherein:

FIG. 1 is a schematic view of a first embodiment of a one-color dye temperature indicator of the present invention;

FIG. 2 is a schematic view of a second embodiment of two-color dye temperature indicator of the present invention;

FIG. 3 is a schematic view of a third embodiment of the temperature indicator of the present invention wherein a collar is provided for seating the temperature indicator properly into a food product;

FIG. 4 is a schematic view of a fourth embodiment of the temperature indicator of the present invention wherein the top end is modified to create a larger, more noticeable color indicator;

FIG. 5 is a schematic view of a fifth embodiment of the temperature indicator of the present invention, much like that of FIG. 4;

FIG. 6 is a schematic view of a sixth embodiment of the temperature indicator of the present invention, which has a top end like the temperature indicator shown in FIG. 4 but which has a shortened stem.

FIG. 7 is sectional view of a seventh embodiment of the temperature indicator of the present invention wherein an insert holder combines with a tubular temperature indicator like that of FIG. 1.

BEST MODE OF CARRYING OUT THE INVENTION

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit and scope of the invention as defined by the appended claims.

Referring to FIG. 1, a first embodiment of a temperature indicator 10 constructed in accordance with the present invention includes an elongated piece of tubing 12 made of a material suitable for high temperature cooking, examples of which include Teflon® PFA and TFE, and PTFE flouropolymer tubing. It is necessary that tubing 12, as well as the other components of the temperature indicator, be suitable for cooking temperatures required to properly cook common food items, such as meat, fish and poultry. Preferably, tubing 12 can handle temperatures up to 500° F.

A top cap 14 seals the upper, open end of tubing 12 and a bottom tip 16 seals the lower, open end of tubing 12. Top cap 14 and bottom tip 16 are made of suitable high temperature materials such as high temperature thermal plastic, heat stabilized nylon, brass or other compatible metals.

Bottom tip 16 includes a somewhat pointed tip end 18 that is pointed enough to allow for easy insertion of the temperature indicator into meat or poultry food products, yet which is not so pointed that it would cut through a person's skin if improperly handled. Both top cap 14 and bottom tip 16 include a barb 20 for preventing separation of tubing 12 from top cap 14 and bottom tip 16 and thus providing a sealed mechanical interlock at each end of tubing 12.

Within tubing 12 is provided a first media 22 and a second media 24 which together fill substantially all of the interior space in tubing 12 between top cap 14 and bottom tip 16. Either one or both of media 22 and 24 can be solid at room temperature. Preferably, first media 22 is solid at room temperature and occupies a substantial majority of the interior space of tubing 12 for reasons discussed later. Alternatively, second media 24 may be solid and first media 22 may be liquid. Either way works as long as the solid media melts at the desired cooking temperature.

Media 22, 24 may take the form of any of a variety of organic or wax materials such as, for example, fats, fatty acids, alcohols, esters, triglycerides, glycerin, ketones, amines, anilides, and amides, or paraffin materials, and microcrystalline waxes, which may be solid at room temperature, but which are chosen for their specific melting points that, as discussed herein, correspond to various desired cooking temperatures for food products. Alternatively, first media 22 may be an oil, such as mineral oil. With an oil or other fluid as the first media 22, there would not be a color indication until the second media melts and mixes with the first media.

First solid media 22 preferably is clear in appearance while second solid media 24 is chosen to have an easily noticeable color, such as for example red or blue. However, other color and/or clear combinations are possible. Also preferably, second solid media is a concentrated dye media, which when mixing with the first media, produces a deep, rich color. Temperature indicator 10 is inserted into a food product, bottom tip 16 first, with top cap 14 protruding from the food product, and is "cooked" along with the food product. As the interior of the food product reaches a desired cooking temperature, first solid media 22 melts and then second solid media 24 melts, which causes the two media to mix, producing a homogeneous mixture throughout the interior of tubing 12.

The homogenous mixture essentially assumes the color of the concentrated dye of second media 24, due to its concentration, and produces a sufficiently brilliant color to be easily recognized. This color change is easily noticed through a viewing window of for example an oven, and thereby provides a noticeable indication that the food product is done cooking. Alternatively, if the first media is an oil, then mixing occurs when the second solid media reaches melting temperature.

Preferably, the second solid media has a specific gravity that is less than the specific gravity of the first solid media. With the enclosed tubular structure oriented in a food product with the first end up, the second solid media rises up into the first solid media when the two have melted, enhancing mixing of the two media.

While different color combinations can be chosen for first and second media 22, 24, it is necessary that the resulting homogenous solution have a color different from that of the first solid media 22, which color difference of course provides the necessary indication that the food has reached a desired temperature. As an example of media for achieving a desired cooking temperature of 161 20 F., Luxco Fully Refined Paraffin Wax 160 with Yaley Enterprises #110688 Powdered Dye can be selected for second solid media 24, which is red in color. For first solid media 22, Luxco Fully Refined Paraffin Wax 140 can be chosen, which has a melting point of 138° F. With this combination of solid media, first solid media 22 melts first when the temperature reaches 138° F. along the upper section of temperature indicator 10, and then second solid media 24 melts when the temperature reaches 161° F. The two liquid solutions mix, creating a homogenous solution with a consistent red color.

Temperature indicator 10 can be manufactured or assembled using a vacuum drawing process for drawing liquefied media into the tubing. This technique is advantageous because it substantially eliminates the creation of an air bubble within the tubing. The bottom tip is inserted onto and seated against one end of the tubing and then a needle is inserted into the opposite, open end of the tubing until a sealing collar of the needle mates with the tubing's open end, thus sealing the interior of the tubing. At this point the needle should be adjacent or contacting the inner end of the bottom tip. The needle is connected to a container in which is held a liquefied second media. The needle is retracted out of the tubing and the liquefied second media is drawn into the tubing. The amount of second media drawn into the tubing is a function of its color concentration and the volume of the first solid media. It is necessary that the second media produce an easily noticeable color after mixing with the first media. The longer tubing 12 is, the greater will be the volume of the first solid media. Thus, the concentration of second solid media will need to be increased or its volume will need to be increased for longer temperature indicators in order to maintain color consistency.

After the second media has solidified at the base of the tubing, a second needle, connected to a container of the first media, in liquid form, is inserted into the tubing, and a similar vacuum drawing process is performed to fill the rest of the tubing with the first media. The first media is allowed to solidify, and then the top cap is placed on the upper end of the tubing. This process of manufacturing or assembling the temperature indicator is suitable when the first and second media have different melting temperatures, which is desirable, with the first media having a lower melting temperature than the second media.

However, it is possible to select a first media with the same melting temperature as the second media, in which case the first media still tends to melt before the second media, as it is the first media to warm up. With similar melting points, it is preferable to place the first and second media into the tubing in solid form, to prevent premature mixing of the two media. It is also possible to select a first media with a higher melting temperature than second media, in which case the second media melts first, but will not mix with the first media until the first media melts completely. As long as the first media is solid against the second media, they will not mix.

Referring to FIG. 2, a second embodiment of a two-color temperature indicator 30 is shown that includes three different media. A first solid media 22 and a second solid media 24 are joined by a third solid media 32 within tubing 12 and sealed by top cap 14 and bottom tip 16. Optionally, a first barrier layer 34 may be placed between first media 22 and second media 24, and a second barrier layer 36 may be placed between second media 24 and third media 32. Barrier layers 34, 36 may be made of a similar fatty organic or wax compound and are provided to prevent premature blending or migration between the first, second, and third media. The melting temperatures for barriers 34, 36 can be the same as or between the melting points of the adjacent media 22, 24, 32. When barriers 34, 36 reach their melting temperatures, they dissolve or melt and do not interfere with proper mixing of the three media.

The colors of second media 24 and third media 32 should be chosen to produce a noticeable color change, similar in degree to the color change achieved with the mixing of the first and second media but different in color. For example, first media 22 may be translucent, second media 24 may be red and third media 32 may be blue. The mixing of all three media produces a purple color. Other color choice combinations are obviously available.

As heat penetrates into the food product, first solid media 22 melts, followed by the melting of barrier layer 34. Then the second solid media 24 melts, causing mixing of the first and second media and resulting in a noticeable first color change at the top end of the temperature indicator. Since the temperature indicator is sticking out of the food product, there is a visible indication that the product is approaching a temperature for proper cooking. When third solid media 32 and barrier layer 36 melt, additional mixing occurs, which results in a second color change, indicating that the food product has reached its cooking temperature.

The terms "one-color" and "two-color" temperature indicator refer to the number of color changes that take place in the device, as opposed to being a reference to the number of different media within the tubing of the temperature indicator. Thus, while a temperature indicator may have two different media, it is considered a one-color temperature indicator because it only produces one color change.

An important advantage of a two-color temperature indicator is that, with three media, the temperature indicator can start to act like a timer. The volume or length of second media 24 can be selected based on how long it takes to melt at a given cooking temperature, the more volume for second media 24, the longer it takes to melt. When second media 24 starts to melt and mix with the already liquefied first media, the noticeable change in color indicates that the food product is a particular amount of time from reaching its desired cooking temperature. In other words, the melting of second media 24 acts as a timer. When the third media melts and mixes with the mixture of the first and second media, then the "timer" is finished, and the food product has reached its temperature. During the time interval between the mixing of the first and second media and the mixing of all three media, i.e. during the time that the second media takes to fully melt, a cook can start preparing or rewarming other dishes that don't take as long to prepare as the food product in question.

FIG. 3 shows a modified version of the temperature indicator of FIG. 1. Modified temperature indicator 40 of this third embodiment includes a collar 42 secured around tubing 12 at a position spaced from top cap 14. Collar 42 is provided to ensure that temperature indicator 40 is positioned or seated properly with collar 42 against the exterior of the food product with bottom tip 16 at an appropriate depth into the food product. Collar 42 can also be provided on the temperature indicator shown in FIG. 2.

Referring to FIG. 4, a fourth embodiment of a temperature indicator 50 of the present invention is shown. Temperature indicator 50 includes a top end 52 that is modified from the top end of the temperature indicator of FIG. 1, while the remainder of temperature indicator 50 is like that shown in FIG. 1. Top end 52 includes a depth flange 54 and a raised dome 56, which create a wide interior space 58 that is contiguous with the interior space 60 of tubing 12. First solid media 22 fills up interior space 58 as well as a substantial portion of the interior space 60 of tubing 12. In this embodiment, an optional barrier 34 is shown, but could be eliminated if desired. Second solid media 24 occupies a small segment at the base of the indicator adjacent bottom tip 16.

Temperature indicator 50 is inserted into a food product until depth flange 54 abuts against the exterior of the food product, similar to the insertion technique for the temperature indicator of FIG. 3. Depth flange 54 ensures that the temperature indicator is properly seated into the food product with bottom tip 16 at the proper depth within the food product. Other types of devices could be used instead of depth flange 54 to ensure proper seating of the temperature indicator.

With this embodiment of a temperature indicator, the mixing of first media 22 with second media 24 creates a larger color indicator in top end 52 that is extremely easy to see. In addition, temperature indicator 50 has the advantage that it can be fully pre-seated into a food product, such as a whole chicken, at a processing plant, and then wrapped, prior to shipping, in a manner that the temperature indicator does not interfere with the wrapping. In other words, the temperature indicator doesn't stick up out of the food product, as does the temperature indicators of FIGS. 1–3, and thus allows the food product to be efficiently wrapped with minimal packaging.

The method of assembling temperature indicator 50 varies slightly. The indicator 50 is placed upside-down. First media 22 is vacuum-drawn, and then second media 24 is filled to allow tip 16 to be inserted.

The temperature indicator 70 of FIG. 5 is similar to that shown in FIG. 4 except that the barrier between the first and second media has been eliminated and the design of top end 72 is different. Top end 72 includes a depth flange 74 and a dome cover 76, which is formed separately from depth flange 74, then later attached at the perimeter of depth flange 74 by, for example, adhesive sealing. Depending on the materials selected for tubing 12, depth flange 74 and dome cover 76, it may be necessary to form each piece separately and then secure them together as shown by adhesive sealing, ultrasonic welding, mechanical interlock, or other techniques known in the art. Aside from the manufacturing technique, temperature indicator 70 operates the same way as the temperature indicator shown in FIG. 4.

Referring to FIG. 6, a sixth embodiment is shown wherein temperature indicator 80 includes a top end 82 similar to the top end of the temperature indicator shown in FIG. 4, but a modified body 84. Top end 82 includes a depth flange 86 and a dome cover 88, which create an upper space 90, and a short tubular, lower extension 92. A bottom tip 94 similar to the bottom tips shown in previous embodiments includes a barb 96 for securing the bottom tip to lower extension 92. The body of bottom tip 94 includes a hollow cavity 98 that is contiguous with upper space 90 and which terminates adjacent the bottom end of tip 94. A first solid media 100 is placed in upper space 90 and a second solid media 102 is placed in hollow cavity 98. Mixing of the two media upon melting produces a wide diameter color indicator that is easily seen.

Temperature indicator 80 is ideal for thin food products, such as hamburgers and steaks, as well as chicken and fish patties. With growing public awareness and concern for food safety, it is more important than ever to ensure that prepared foods are safe to eat. Current cooking methods, which rely largely on the subjective observations of food preparers, have not proven entirely safe. In fact, the federal U.S. government is considering stricter rules and regulations for the preparation of various foods.

Referring to FIG. 7, a seventh embodiment of the present invention includes modified temperature indicators 110, 112, 114 that are similar to the temperature indicator of FIG. 1 with the exception that their bottom ends 116 are squared off. Each include a first and second solid media 122, 124, and a top cap 130. The organic or wax dye media 122, 124 within indicators 110, 112, 114 are pre-selected for different temperatures, such as may be desired for cooking poultry, beef or pork, and are pre-sealed and can be sold as a package.

An insert barrel 134 includes a tubular body 136 with an inside diameter sized to receive a temperature indicator 110, 112, or 114. Tubular body 136 has a pointed bottom tip 138 and a flanged top 140. Barrel 134 also comes with a temporary cap 142.

Barrel 134 is inserted into a food product, preferably at a processing facility, seated with flange 140 against the food product, and then closed by temporary cap 142. Temperature indicators 110, 112, 114 can be sold separately or along with the food product. For cooking the food product, a consumer selects the temperature indicator desired, removes cap 142, and inserts the temperature indicator into tube 136 of pre-inserted barrel 134. Naturally, barrel 134 should be inserted into a food product so that it angles downwardly into the food product. This ensures that the temperature indicator stays seated in the tubular body of the barrel.

An advantage of this embodiment of the present invention is that the food product can be packaged, such as by shrink wrapping, without a temperature indicator sticking out of the food product. A protruding tube would interfere with packaging material and may be damaged or broken by the packaging material. Barrel 134 inserts into the food product until flange 140 seats against the exterior of the food product, and then the food product is packaged with little or no extra packaging material required to cover the barrel and cap. After the food product is purchased, a consumer can simply add a separate temperature indicator prior to cooking and can, if desired, purchase a variety of temperature indicators for use with different types of food products.

It is important that the thermal conductivity of the material chosen for barrel 134 be quite high so that rapid heat transfer can take place between the interior food product and the temperature indicator held by barrel 134. Examples of suitable materials include heat stabilized nylon 66.

The various embodiments of temperature indicators shown herein each provide a simple temperature indicator that is relatively inexpensive to manufacture, thus ensuring widespread use on a variety of food products, and which is easy to use and reliably indicates a desired cooking temperature of a food product.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto when read and interpreted according to accepted legal principles such as the doctrine of equivalents and reversal of parts.

What is claimed is:

1. A temperature indicator comprising
   an enclosed hollow and elongated structure,
   a first media disposed within the enclosed hollow and elongated structure, the first media occupying a first portion of the enclosed hollow and elongated structure and having a first color,
   a second media disposed within the enclosed hollow and elongated structure away from said first portion of the enclosed hollow and elongated structure and having a second color,
   one of the first media and second media having a melting point of at least 138° F. so that the first and second media mix with one another upon melting of the one of the first media and second media having a melting point of at least 138° F. and form a color that is different from the first color.

2. The temperature indicator of claim 1 wherein, the first media is a solid media and the second media has a specific gravity that is less than the specific gravity of the first solid media, so that with the enclosed tubular structure oriented with the first end up, the second media rises up into the first solid media when the two have melted, enhancing mixing of the two media.

3. The temperature indicator of claim 1 wherein, the first and second media are made of one of an organic material and food grade wax media.

4. The temperature indicator of claim 1 wherein, the first and second media abut one another within the tubular structure.

5. The temperature indicator of claim 1 wherein, the enclosed tubular structure is comprised of a length of tubing and top and bottom caps that seal off the open ends of the tubing, and wherein the tubing and top and bottom caps are made of a material suitable for cooking temperatures required to properly cook common food items.

6. The temperature indicator of claim 5 wherein, the enclosed tubular structure is capable of withstanding cooking temperatures up to 500° F.

7. The temperature indicator of claim 1 wherein, the enclosed tubular structure includes a device that ensures proper seating of the temperature indicator into a food product.

8. The temperature indicator of claim 7 wherein, the proper seating device comprises a depth flange.

9. The temperature indicator of claim 1 wherein, the enclosed hollow and elongated structure includes a wide top end with a large space filled with the first media, which when mixed with the second media, creates a large, easily noticeable color indication.

10. The temperature indicator of claim 9 wherein, the wide top end creates a flange for properly seating the temperature indicator into a food product.

11. The temperature indicator of claim 1 wherein, the enclosed hollow and elongated structure includes a short hollow and elongated body that is closed off and sealed by a bottom tip and wherein the bottom tip includes a cavity for holding the second media.

12. The temperature indicator of claim 11 wherein, the enclosed hollow and elongated structure includes a wide top end with a large space filled with the first media, which when mixed with the second media, creates a large, easily noticeable color indication.

13. The temperature indicator of claim 12 wherein, the wide top end creates a flange for properly seating the temperature indicator into a food product that is relatively thin.

14. A temperature indicator for indicating a cooking temperature of a food product, comprising
an enclosed hollow and elongated structure, at least a portion of the structure being translucent,
a temperature indicating media within the hollow and elongated structure,
the temperature indicating media having a visible initial color at room temperature and a color different from the initial color at a desired temperature of at least 138° F.,
a holder for inserting into a food product and for receiving the enclosed hollow and elongated structure in order to position a first end of the hollow and elongated structure within the interior of the food product, the holder having a length that is shorter than the length of the hollow and elongated structure, so that a second, opposite end of the hollow and elongated structure protrudes from the holder and is visible when inserted therein so that the different color can be seen through the translucent portion at the exterior of the food product.

15. The temperature indicator of claim 14 wherein, the holder has a closed, bottom end and an open top end for receiving the hollow and elongated structure.

16. The temperature indicator of claim 15 wherein, the holder has a flange at its open end for seating the holder into the food product.

17. The temperature indicator of claim 15 wherein, the open end includes a removable cap for closing the open end.

18. The temperature indicator of claim 14 wherein, the temperature indicating media includes a first solid media with a first color and a second solid media with a second color, the second solid media having a melting temperature that corresponds to the desired temperature, whereby upon melting of the first and second media the first and second media mix with one another to form said visible color different from the initial visible color.

19. The temperature indicator of claim 18 wherein, the second solid media has a specific gravity that is less than the specific gravity of the first solid media, so that with the enclosed tubular structure oriented with the first end up, the second solid media rises up into the first solid media when the two have melted, enhancing mixing of the two media.

20. The temperature indicator of claim 18 wherein, the first and second media are made of one of an organic material and food grade wax media.

* * * * *